United States Patent [19]

Martin et al.

[11] Patent Number: 4,608,526

[45] Date of Patent: Aug. 26, 1986

[54] ELECTROMECHANICAL ACTUATOR FOR THE TONGS OF A SERVOMANIPULATOR

[75] Inventors: H. Lee Martin; Stephen M. Killough, both of Knoxville, Tenn.

[73] Assignee: The United States of America as represented by the United States Department of Energy, Washington, D.C.

[21] Appl. No.: 724,865

[22] Filed: Apr. 19, 1985

[51] Int. Cl.[4] .............................................. G05B 11/01
[52] U.S. Cl. .................................... 318/628; 318/618; 74/495; 244/223; 901/31
[58] Field of Search .................. 318/628, 618; 74/495; 244/223; 901/31, 32, 33

[56] References Cited

U.S. PATENT DOCUMENTS

| 3,476,335 | 11/1969 | Andeen et al. ................. 318/628 X |
| 4,472,668 | 9/1984 | Mutschler et al. .................. 318/568 |
| 4,477,043 | 10/1984 | Repperger .......................... 244/223 |
| 4,513,235 | 4/1985 | Acklam et al. ................. 318/628 X |
| 4,531,080 | 7/1985 | Nordstrom et al. ................ 318/628 |

*Primary Examiner*—B. Dobeck
*Attorney, Agent, or Firm*—David E. Breeden; Stephen D. Hamel; Judson R. Hightower

[57] ABSTRACT

Computer-augmented electromechanical system is provided for controlling the tongs of a servomanipulator. The mechanical tongs are motor-driven through the remote slave arm of the manipulator, and the motor control current is supplied by a position sensor which senses the position of a spring-loaded trigger in the master arm handle on the manipulator. The actuator for the tongs provides the operator with artificial force reflection in a unilateral force-force control loop.

3 Claims, 5 Drawing Figures

ELECTROMECHANICAL ACTUATOR FOR THE TONGS OF A SERVOMANIPULATOR

This invention relates to the art of servomanipulators. This invention is a result of a contract with the United States Department of Energy.

BACKGROUND OF THE INVENTION

Traditionally, the tongs which are mounted at the end of a slave manipulator arm have been mechanically controlled like other joints of the arm. This has been by means of a bilateral force-reflecting drive trains built into the master and slave arms of the manipulator. Alternatively, the tongs are operated by a cable/spring arrangement in which the spring closes the tongs, and a cable in the slave arm is used to open the tongs against the force of the spring.

Neither of these approaches could be implemented in an advanced servomanipulator being developed at the Oak Ridge National Laboratory which is disclosed in a co-pending application Ser. No. 720,449 filed Apr. 5, 1985 for Advanced Servo Manipulator by William E. Holt et al and incorporated herein by reference thereto.

The cable/spring arrangement did not provide the positive opening and closure that was desired with modular design of the slave arm, and the force-reflection threshold of a backdrivable gear train was unacceptably high and incorporated very large amounts of backlash due to the large number of gear meshes necessary to drive the tongs.

SUMMARY OF THE INVENTION

The present invention is a computer-augmented electromechanical means of actuating the tongs in the slave arm of a servomanipulator with artificial force-reflection. The actuator incorporates a position sensor driven by a spring biased trigger mechanism mounted in a master controller handle to give the operator artificial force reflection. As such, it is an electromechanical system, not a backdrivable gear train system. The position sensor may take the form of a potentiometer which is adjusted by movement of the trigger to generate a signal proportional to position and squeeze force. This signal is fed to a computer which is programmed to generate a current drive signal to a motor in the slave unit which drives the tongs through appropriate gears in accordance with the velocity and force of the trigger movement. Since the position of the tongs is related, through the spring constant of the actuator spring, to the force applied by the operator, this is a unilateral force-force loop.

The control system is very flexible since the gains can be changed in the software to make the tongs very sensitive to the actuator force for delicate tasks and insensitive for heavy jobs. The actuator spring bias can also be changed for various tasks or for individual operators.

BRIEF DESCRIPTION OF THE DRAWINGS

These and further features of the present invention will be better understood from the following description when read in conjunction with the drawings in which.

DETAILED DESCRIPTION OF THE PREFERRED EMBODIMENT

Figure 1:
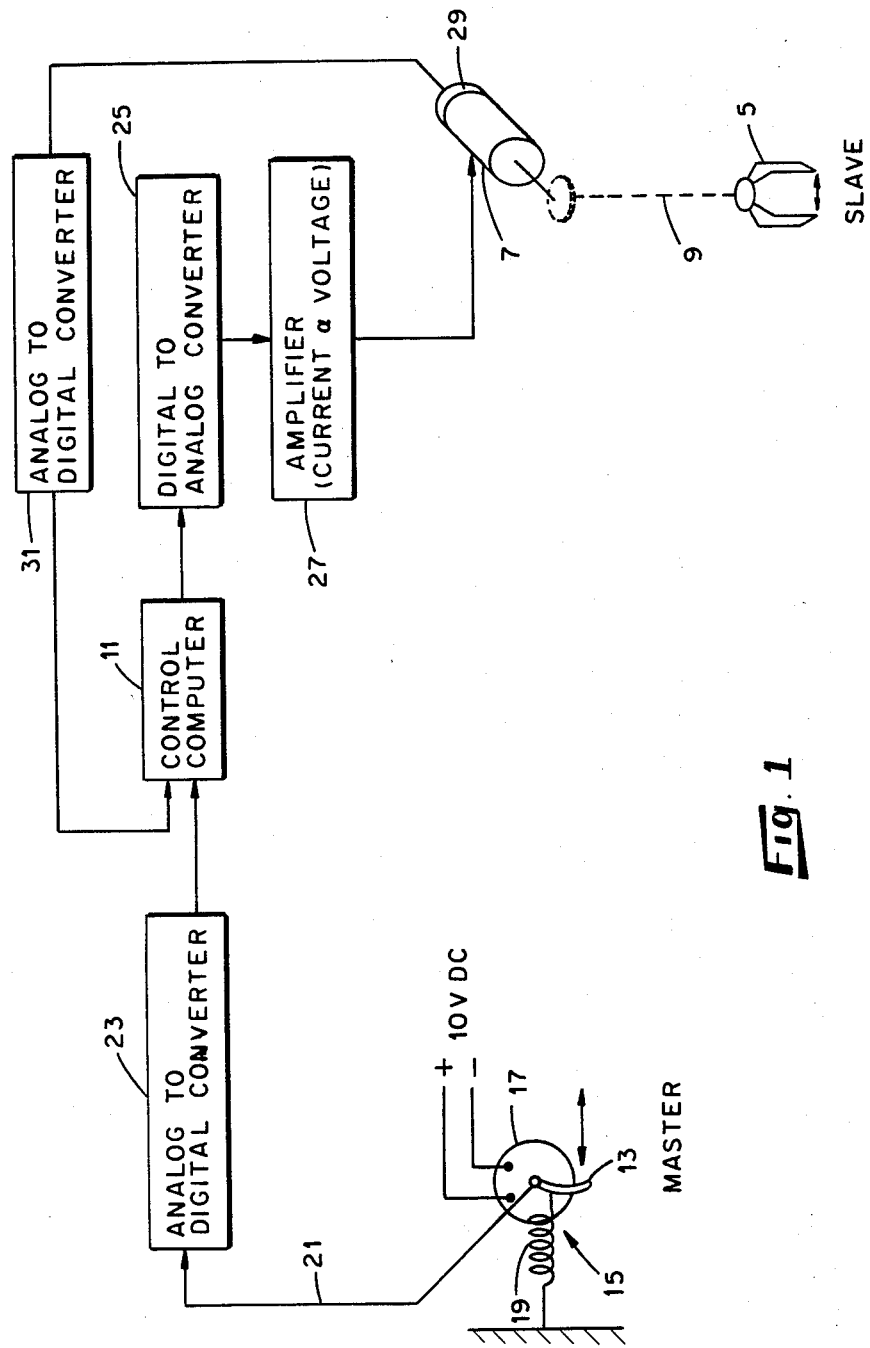
FIG. 1 is a schematic diagram of an electromachanical actuator for controlling the tongs of a servomanipulator in accordance with the present invention.

Referring to FIG. 1, there is shown a control system for controlling the tongs 5 of a slave arm (not shown) of a servomanipulator. The tongs 5 are opened and closed by a servo motor 7 through an appropriate mechanical arrangement 9 coupling the motor shaft to the tongs 5. A detailed description of the mechanical arrangement 9 may be had by referring to the above-referenced application. In accordance with the invention described herein, it will suffice to say that when the motor shaft is rotated in one direction the tongs are closed and when reversed the tongs are opened.

Figure 3:
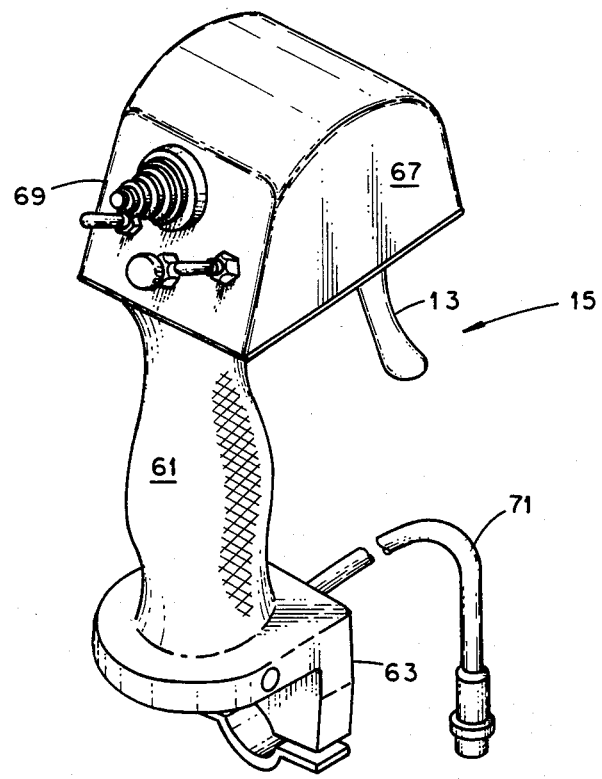
FIG. 3 is a perspective view of the manipulator master control handle which is adapted for attachment to the wrist assembly of a master control arm.

The motor 7 control signal is generated by a signal processing circuit including a digital computer 11 in response to a voltage signal proportional to the displacement and squeeze force applied by an operator to a trigger 13 provided on a control handle 15 (see FIG. 3). The trigger 13 is attached to the rotating shaft of a potentiometer 17 and is spring biased by means of a compression spring 19 to resist the squeezing motion applied by the operator. A 10 V dc voltage source is connected across the potentiometer so that as the trigger 13 is squeezed against the force of the spring 19 a positive voltage signal proportional to the displacement and squeeze force is applied through lead 21 connected between the movable arm terminal of the potentiometer 17 and one input of an analog-to-digital converter 23. The output of converter 23 is connected to one input of the computer 11. The output of computer 11 is connected through a digital-to-analog converter 25 and an amplifier 27 to the input of motor 7. A tachometer 29 is provided to measure the velocity of the motor 7 and generates a feedback back voltage proportional thereto. The output of tachometer 29 connected to the input of an analog-to-digital converter 31 whose output is fed to a separate input of computer 11. This velocity feedback loop together with a high pass filter action provided by the computer produces enhanced operation of the tongs.

Figure 2:
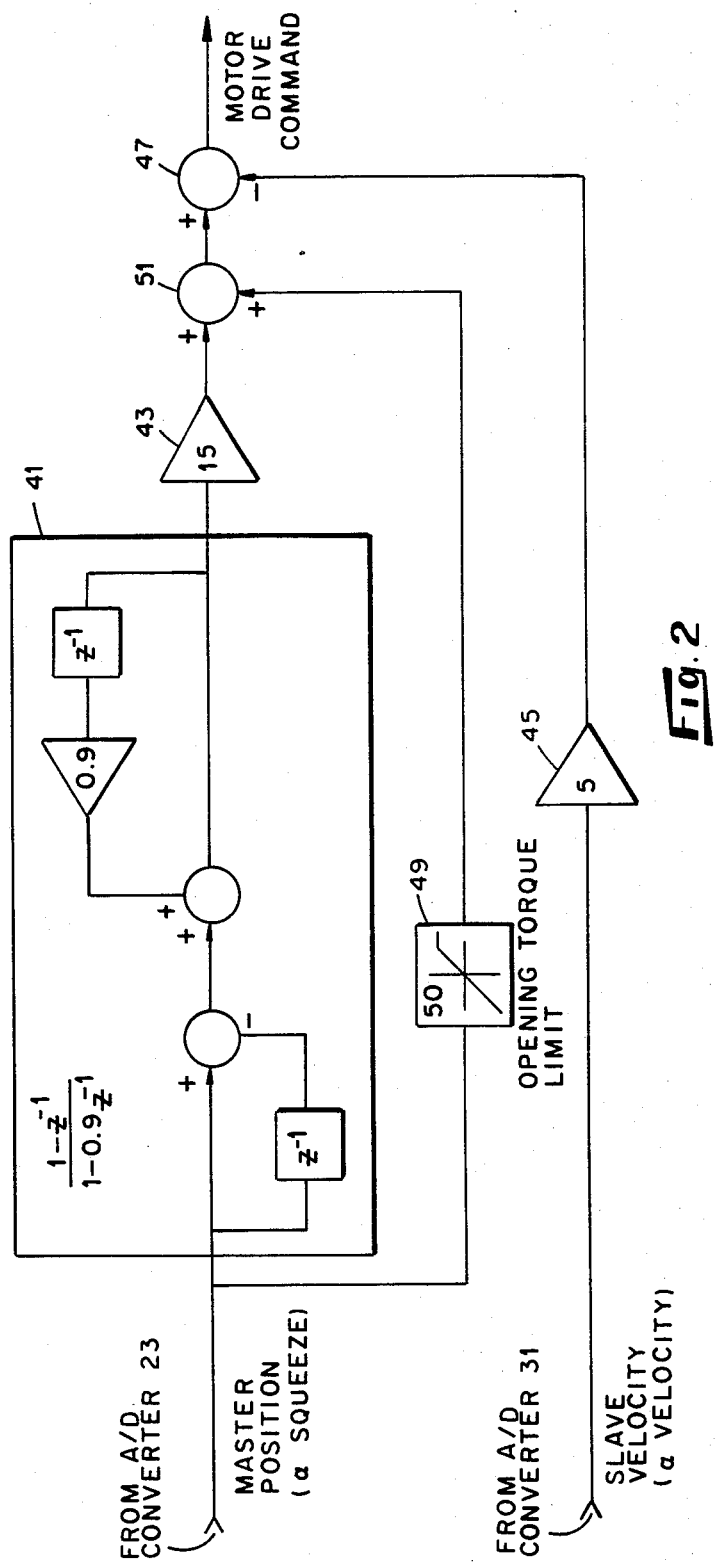
FIG. 2 is a schematic diagram representation of the computer generation of the motor drive signal for the system shown in FIG. 1.

The manner in which the computer 11 generates the motor 7 drive signal is illustrated schematically in FIG. 2. A high pass filter illustrated within block 41 with a response as indicated, where Z is the Z transform (i.e, $Z^{-1}$ is a delay of one sample time unit), produces velocity feedforward control of the tongs by providing additional drive to the motor 7 whenever the master trigger 13 is in motion. Additional gain is provided by element 43 under these conditions. This improves slave response by accelerating the slave tongs quicker and keeps their motion in phase with the trigger operation. Tachometer feedback from the slave drive motor 7 is used to provide stability in the control loop by damping the motion of the tongs by subtracting the velocity signal at the output of converter 31, which has been modified by an appropriate gain factor set in element 45, from the generated acceleration signal at summming element 47.

When the master trigger motion stops changing, the filter 41 causes the acceleration term to decay leaving only the force control loop through element 49 active. This value is provided through summing element 51 to the summing element 47. The combination of these two loops provides quick motion response while controlling the force by monitoring the operator squeeze effort. The opening force applied to the tongs is limited by the response of the force loop element 49, as indicated by the horizontal portion of the response curve of element 49, to prevent large torques from being applied to the roll axis of the manipulator during periods of tong inactivity. Thus, control of the tongs 5 is accomplished with simplified mechanical hardware through the computer enhanced control. The resulting system yields artificial force-reflection operation without the cost and complexity of two motor backdrivable servo loops.

Figure 4:
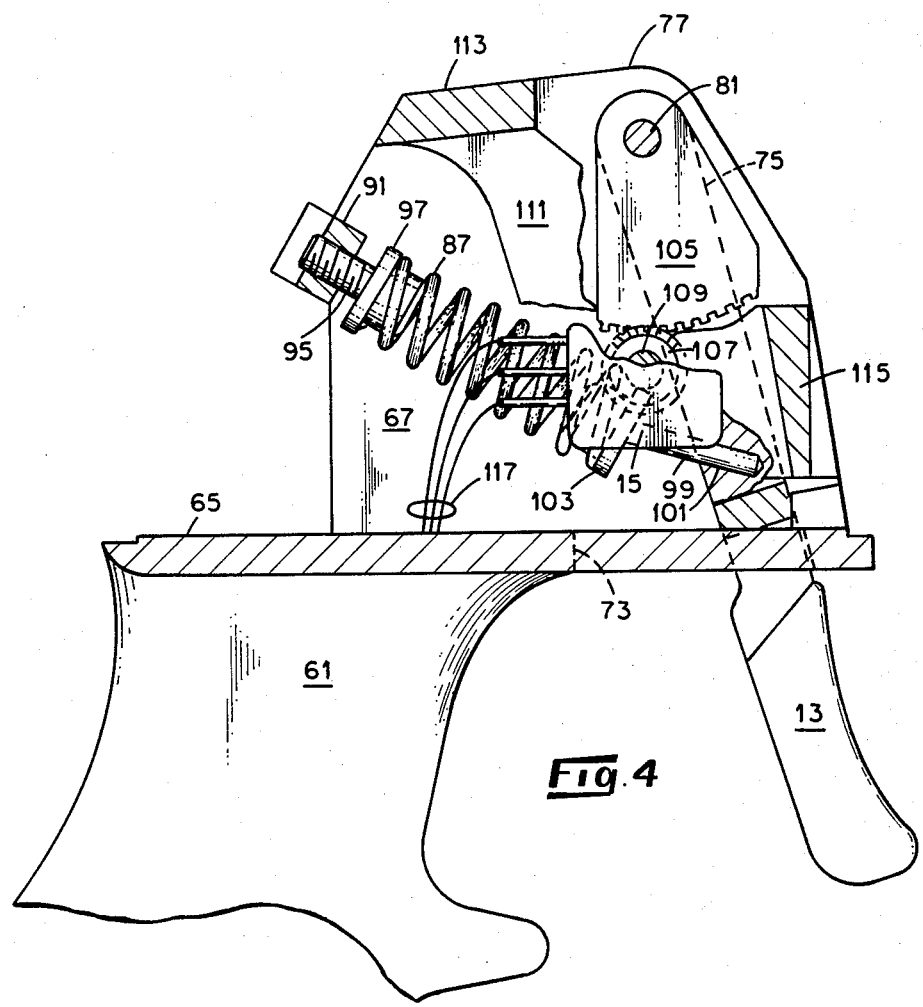
FIG. 4 is a sectional, partial side view of the control handle of FIG. 3 with the upper cover removed to show the actuator assembly.
Figure 5:
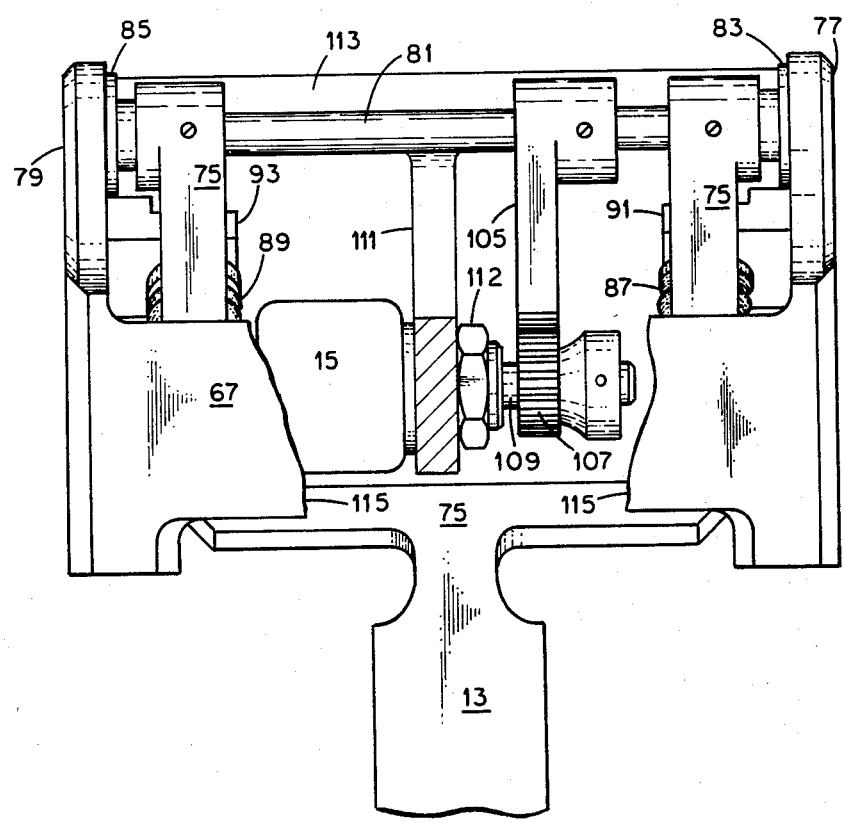
FIG. 5 is a front view of FIG. 4 with the actuator assembly support partially broken away to show the actuator assembly.

Referring now to FIGS. 3, 4 and 5, the master operator handle 15 assembly includes a central upstanding grip portion 61 contoured to fit either hand of the operator with a lower clamp assembly 63 attached thereto which may take various forms suitable for attaching the handle 15 to the wrist assembly of the master control arm (not shown). The upper end of the grip 63 terminates in a mounting platform 65 including an upstanding frame portion 67 in which the actuator assembly is mounted. The platform 65 is adapted to receive a top cover 67 (FIG. 3) which covers the actuator assembly and provides a mounting surface 69 on which various other controls for the servomanipulator not related to the present control system described herein may be mounted as shown in FIG. 3. An electrical connecting cable 71, extending from within the upper cover 67 through grip 61 and out through the mounting assembly 63, is provided for connecting the potentiometer 15 of the actuator for the tongs and other control switches for the manipulator control system mounted on cover 67.

The platform 65 has an opening 73 through which the trigger 13 extends downward to a position convenient for actuation by the operator's index finger. The trigger 13 forms a portion of a yoke 75 which is pivotally mounted between upper extending side wall portions 77 and 79 of the frame 67 by attaching the forked ends of the yoke to a drive shaft 81. The shaft 81 extends into bearings 83 and 85 mounted in openings (not shown) in the walls 77 and 79, respectively, and openings in the yoke ends. The yoke ends are clamped to the shaft 81 so that it is rotated by the yoke 75.

The yoke 75 is spring biased by means of compression springs 87 and 89 disposed between back brackets 91 and 93, respectively of the frame 67 and the lower part of the corresponding forks of yoke 75. The springs are identically mounted as shown in detail in FIG. 4 for spring 87. Spring 87 is adjustable attached to the frame support bracket 91 by means of a set screw 95 threaded through the bracket into a cup shaped end member 97 which fits partially into one end of the spring 87. The screw 95 may be adjusted to alter the compression of the springs for a particular application or to change the compression for different operators. The other end of the spring is pivotally connected to the yoke 75 by means of a pin 99 having one end mounted in an opening 101 of yoke 75 and the other end extending into another cup-shaped end member 103, identical to cup 97, fitted into the other end of spring 87. The springs bias the trigger so that they resist the squeeze force applied to the trigger 13, thereby creating the artificial force reflection.

As the trigger is squeezed toward the grip 61 of the handle the shaft 81 rotates thereby rotating a pie gear 105 attached to a spur gear 107 engaged therewith. The spur gear 107 is attached to the shaft 109 of the potentiometer 15. The potentiometer 15 is mounted in position through an opening in a support web 111 by means of nut 112. The web 111 extends between a back cross member 113 of frame 67 and a front cross member 116 of frame 67. The potentiometer is connected to the 10 V dc power supply and to the input of the converter 23, as shown in FIG. 1, by means of the three wires 117 which form a part of the handle 15 connecting cable 71 (FIG. 3).

Thus, it will be seen that a very flexible electromechanical control system has been provided for operating the tongs of a servomanipulator in which artificial force-reflection actuation may be tailored to match the grip of individual operators and the gains in the system can be changed in the software to make the tongs very sensitive to the trigger force for delicate tasks and insensitive for heavy jobs. This system provides a simple, reliable means of controlling manipulator tongs.

Although the electromechanical control system for tongs of a servomanipulator has been described above in terms of a specific embodiment, it will be obvious that various modifications and changes may be made therein with departing from the spirit and scope of the following claims. For example, the system could be used in future robot control systems during the teaching phase of operation. The use of a simple force control device with standard teach pendants would allow robots to pick up delicate items with controlled taught forces.

We claim:

1. An electromechanical control system for controlling a pair of tongs in a servomanipulator system, comprising:

a servo motor mechanically coupled to said pair of tongs for opening and closing said pair of tongs in response to a drive signal applied to said servo motor;

an actuator means including a spring biased trigger mechanism operable by an operator in which squeeze force applied by said operator to said trigger mechanism is resisted to produce an artificial force reflection to said operator for generating a control signal proportional to the displacement and squeeze force applied by said operator to said trigger mechanism;

an analog-to-digital converter connected to receive said control signal at an input thereof, a digital computer connected and programmed to generate a digital drive signal at an output thereof which is proportional to the rate of displacement of said trigger and the squeeze force applied by said operator; and an analog-to-digital converter connected between the output of said computer and an input of said servo motor so that said pair of tongs are operated to open or close in corresponding response to the displacement of said trigger mechanism of said actuator means and maintain an applied force proportional to the operator squeeze force.

2. The control system as set forth in claim 1 further comprising a tachometer coupled to the drive shaft of said servo motor for generating a velocity feedback signal at an output thereof proportional to the velocity of rotation of said servo motor, a further analog-to-digital converter connected between the output of said tachometer and a further input of said computer, said computer being further programmed to alter said digital drive signal in response to said velocity feedback signal in a negative feedback arrangement to provide damping of the motion of said pair of tongs when operated by said operator.

3. The control system as set forth in claim 2 wherein said actuator means includes a control handle having an upper frame member, a trigger connected at one end to a drive shaft disposed in said frame for rotation about the longitudinal axis thereof, said trigger depending from said frame to a position accessable by the index finger of the hand of said operator grasping said handle, at least one compression spring mounted between said trigger and a support bracket of said frame so that said at least one spring is compressed when said trigger is squeezed by said operator, a potentiometer disposed in said frame, and having a rotatable adjusting shaft for generating said control signal in response to rotation of said adjusting shaft, and gear means coupling said adjusting shaft of said potentiometer to said drive shaft so that said adjusting shaft of said potentiometer is rotated in response to displacement of said trigger by said operator.

* * * * *